(12) United States Patent
Roblek (10) Patent No.: US 12,106,748 B2
(45) Date of Patent: Oct. 1, 2024

(54) AUTOMATED MINING OF REAL-WORLD AUDIO TRAINING DATA

(71) Applicant: Google LLC, Mountain View, CA (US)

(72) Inventor: Dominik Roblek, Meilen (CH)

(73) Assignee: Google LLC, Mountain View, CA (US)

( * ) Notice: Subject to any disclaimer, the term of this patent is extended or adjusted under 35 U.S.C. 154(b) by 390 days.

(21) Appl. No.: 17/769,624

(22) PCT Filed: Nov. 18, 2019

(86) PCT No.: PCT/US2019/061968
§ 371 (c)(1),
(2) Date: Apr. 15, 2022

(87) PCT Pub. No.: WO2021/101501
PCT Pub. Date: May 27, 2021

(65) Prior Publication Data
US 2023/0033103 A1    Feb. 2, 2023

(51) Int. Cl.
*G10L 15/06*        (2013.01)
*G10L 15/02*        (2006.01)
(Continued)

(52) U.S. Cl.
CPC ............ *G10L 15/063* (2013.01); *G10L 15/02* (2013.01); *G10L 15/08* (2013.01); *H04R 1/406* (2013.01);
(Continued)

(58) Field of Classification Search
None
See application file for complete search history.

(56) References Cited

U.S. PATENT DOCUMENTS 8,750,489 B2    6/2014  Park
9,245,527 B2 *  1/2016  Lindahl .................. G06F 3/167
(Continued)

FOREIGN PATENT DOCUMENTS

JP      H06-289899       10/1994

OTHER PUBLICATIONS

Notice of Allowance in European Appln. No. 19817535.8, dated May 10, 2023, 8 pages.
(Continued)

*Primary Examiner* — Antim G Shah
(74) *Attorney, Agent, or Firm* — Fish & Richardson P.C.

(57) ABSTRACT

Methods, systems, and apparatus, for generated labeled training examples for machine learning. In one aspect, a method includes receiving sets of audio recordings by a user
(Continued)

device. For each set of audio recordings, each audio recording in the set is recorded over a respective separate microphone in the user device during a particular time interval, and each particular time interval is different for each set of audio recordings. For each set of audio recordings, a detector determines whether an audio recording in the set of audio recordings includes a particular audio feature, and whether another one of the audio recordings does not include the particular audio feature. For each set of audio recordings determined to include an audio recording that includes the particular audio feature and to include another audio recording that does not include the particular audio feature, a labeled training example is generated.

19 Claims, 4 Drawing Sheets

(51) Int. Cl.
  *G10L 15/08* (2006.01)
  *H04R 1/40* (2006.01)
  *H04R 3/00* (2006.01)
(52) U.S. Cl.
  CPC ........ *H04R 3/005* (2013.01); *G10L 2015/088* (2013.01)

(56) References Cited

U.S. PATENT DOCUMENTS

| | | | |
|---|---|---|---|
| 11,817,103 B2* | 11/2023 | Wang | G06N 3/084 |
| 2019/0341041 A1 | 11/2019 | Xie | |
| 2021/0074294 A1* | 3/2021 | Shellef | H04R 1/406 |
| 2021/0232760 A1 | 7/2021 | Munro et al. | |

OTHER PUBLICATIONS

Notice of Allowance in Japanese Appln. No. 2022-528676, dated Dec. 25, 2023, 7 pages (with Machine translation).
IN Office Action in Indian Appln. No. 202227023082, dated Aug. 30, 2022, 5 pages (with English Translation).
Cruz-Sandoval et al., "Semi-automated data labeling for activity recognition in pervasive healthcare," Sensors, Jul. 10, 2019, 19(14):3035.
International Preliminary Report on Patentability in International Appln. No. PCT/US2019061968, dated Jun. 2, 2022, 7 pages.
International Search Report and Written Opinion in International Appln. No. PCT/US2019/061968, dated Aug. 10, 2020.
Khoubrouy et al., "Microphone array processing strategies for distant-based automatic speech recognition," IEEE Signal Processing Letters, Oct. 2016, 23(10):1344-1348.
Rodomagoulakis et al., "Room-localized spoken command recognition in multi-room, multi-microphone environments," Computer Speech & Language, Nov. 2017, 46:419-443.
Office Action in Japanese Appln. No. 2022-528676, dated Jul. 3, 2023, 6 pages (with English translation).

* cited by examiner

AUTOMATED MINING OF REAL-WORLD AUDIO TRAINING DATA

CROSS-REFERENCE TO RELATED APPLICATIONS

This application is a National Stage Application under 35 U.S.C. § 371 and claims the benefit of International Application No. PCT/US2019/061968, filed Nov. 18, 2019. The disclosures of the foregoing applications are incorporated herein by reference in their entirety.

In the field of machine learning, acquiring clean and correctly labelled data for training machine learning models must be done to train models. Collection and curation of the date usually involves raters who listen to the data collected in various ways and label the data. Thus, collection of such an audio training data is often very labor intensive, prone to various biases, and subject to privacy risks.

SUMMARY

This specification relates to collecting audio data for training machine learning models to recognize features in audio data. The systems and methods described below facilitates automatic labelling of real-world audio data on-device without the need to transfer them off the device for review by human raters. This reduces the likelihood of private data leakage risks. The labelled data can then be either used on-device for on-device Federated Learning (in which case the day may never need to leave the device), or transferred to the cloud, where the data can be used for server-side training of models (in which case the privacy risks and monetary costs of human raters, which are not needed, are avoided).

In general, one innovative aspect of the subject matter described in this specification can be embodied in methods that include the actions of receiving sets of audio recordings by a user device that includes a plurality of microphones, wherein, for each set of audio recordings, each audio recording in the set is recorded over a respective separate microphone in the plurality of microphones in the user device during a particular time interval, and each particular time interval is different for each set of audio recordings; for each set of audio recordings, determining, by a detector, whether an audio recording in the set of audio recordings includes a particular audio feature, and whether another one of the audio recordings does not include the particular audio feature; for each set of audio recordings determined to include an audio recording that includes the particular audio feature and to include another audio recording that does not include the particular audio feature, generating a labeled training example that includes (i) at least a portion of the audio recording that was determined to not include the particular audio feature, and (ii) a label that indicates the presence of the particular audio feature. Other embodiments of this aspect include corresponding systems, apparatus, and computer programs, configured to perform the actions of the methods, encoded on computer storage devices.

In some implementations, the method further comprises training the machine learned model using the generated labeled training examples. Once trained, the machine learned model can be executed on a user device.

In some implementations, generating the labeled training example that includes (i) at least the portion of the audio recording that was determined to not include the particular audio feature, and (ii) the label that indicates the presence of the particular audio feature comprises: generating the labeled training example so that it includes (i) a portion of each audio recording that was determined to not include the particular audio feature, and (ii) the label that indicates the presence of the particular audio feature. The method may further comprise selecting, from the portion of the audio recording that was determined to not include the particular audio feature, a sub-portion of the audio recording that is coincident in time with a sub-portion of the audio recording that was determined to include the particular audio feature and from which the particular audio feature was determined to be present in the audio recording; and using the selected sup-portion as the portion of the audio recording.

In some implementations, determining, by a machine learned model, whether an audio recording in the set of audio recordings includes a particular audio feature, and whether another one of the audio recordings does not include the particular audio feature comprises: determining whether an audio recording from a first microphone includes the particular audio feature; when the audio recording from the first microphone is determine to include the particular audio feature, determining whether audio recordings from one or more of the other microphones include the particular audio feature; and when the audio recording from the first microphone is determine to not include the particular audio feature, determining that the other audio recordings from the other microphones do not include the particular feature.

Particular embodiments of the subject matter described in this specification can be implemented so as to realize one or more of the following advantages. Audio training data sets that are pre-labeled may be collected without rater review and yet with high confidence that the data are correctly labeled. This greatly reduces audio data collection time and overhead. Because real-world data may be used, collection may be done at various scales without adversely impacting collection time. Moreover, because the audio data is pre-labeled based on an audio feature being recognized by an automated device process, the audio data is not subject human biases inherent in human rater review.

The collection of audio data may be used to train models specifically tailored to particular user devices. For example, upon release of a new mobile device, data collection of audio training data from thousands of devices can be collected in a short period of time (e.g., a day) and a model specific to the new device can be trained and distributed to the devices quickly after the device is released. Because each particular device may have certain acoustic collection characteristic (e.g., certain microphones with particular responses, and a particular physical arrangement for the particular device that differs from other devices), the training data collected for the particular device accurately reflects the model inputs that can be expected for the device. Accordingly, accuracy may be increased when a model is trained on a per-device model basis. Another advantage is the collection of training data specific to particular types of devices (e.g., particular smartphone model), and particular auditory properties of the environments in which the data were captured (e.g., room acoustic, noise background such as city buzz, etc.). Another advantage avoidance of exposing the captured data to human raters, thus minimizing the data leakage privacy risks.

Furthermore, by labelling captured audio data with labels obtained from corresponding audio captured from different microphones, machine learning models subsequently trained on the data can be show a higher accuracy when dealing with edge cases.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Many electronic devices, such as smartphones, usually include multiple microphones, Each individual microphone can record the same audio simultaneously to generating multiple audio recordings of the same audio. This specification describes ways to collect clean and correctly labelled training data automatically and without human review. In particular, the systems and methods describe below enable the acquisition of real world audio recordings to generate training examples for training machine learning models using user devices that include multiple microphones to record audio from the environment. Each training example includes the audio recording from at least one microphone in the user device, and a label that describes an audio feature that was determined to be present in one of the audio recordings, and that was also determined not to be present in the audio recording included in the training example. Because the device determined from an audio recording from at least one microphone as having the particular audio feature, an audio recording generated at the same time from another microphone on the device and that is not determined to have the particular audio feature can be labeled as having the audio feature and used as a training example.

User devices with multiple microphones can generate an audio recording from each microphone. In a given time interval, each microphone will record in the same environment and generate an audio recording in the particular time interval. Generally the recording will include noise. This noise may differ on each channel (a "channel" is an output of a microphone) such that one or more recordings may result in the detection of the feature, while other recordings may not. This may be due to, for example, a hand over one of the microphones, a microphone partially occluded, etc. The quality of each audio recording is also based on the performance characteristics of the microphone, the distance of the microphone from the audio source, and the alignment of the microphone with respect to the audio source. Other factors may also affect the audio quality.

To generate a label for the set of audio recordings, the user device detects the audio feature, e.g., a particular word or phrase, that is spoken in one of the audio recordings in the set of audio recordings. Upon identifying the word in one of the audio recordings with at least a predetermined confidence, the user device may select the audio recording and other audio recordings recorded at the same time to generate a labelled training example. The selected audio data is labeled with the detected word or phrase.

In some implementations, a predetermined microphone and its respective audio recording is used by the machine learning model to detect the audio feature. If the audio feature is not detected, then audio from the other microphones is not processed. Typically the predetermined microphone is a microphone that is of a higher quality than other microphones on the user device, or that is positioned at a location on the user device to receive an uttered voice sound with the least amount of attenuation and occlusion. If the audio feature is detected, then audio from the other microphones is processed to determine if the presence of the feature is not detected in the other audio. This is done, for example, to preserve processing power and battery life on the user device, because running the label detection process over on primary channel to detect an audio feature reduces the number of times the label detection process is invoked for other channels.

In other implementations, audio from each microphone is processed even when the audio feature is not detected in the predetermined microphone.

In some implementations, upon successful detection of the audio feature in one of the audio recordings in the set of audio recordings by the machine learning model, all the audio recordings in the set are used as training examples. In other implementations, only those audio recordings where the word was not detected are used as training examples.

In some implementations, multiple words are spoken during the time interval when the audio is recorded. In such implementations, the machine learning model detects the presence of multiple words in the audio recording and the time stamps associated with each recording. The rest of the audio recording is split on the basis of the time stamps thereby generating an audio recording for the particular audio feature and the corresponding training example where the label is the particular word.

Throughout this specification, the audio feature that is described as an example is a key word or "hot word" for which a speech detection process monitors. However, the methods and systems described below may be used for generating training data for other audio features. For example, that systems and methods may be used to generate training data examples for models that detect sounds other than speech, such as music, or detect sounds from animals and machinery. More generally, the methods and systems can be adapted to generate labeled data for any type of detectable audio features.

These features and additional features are described in more detail below.

Figure 1:
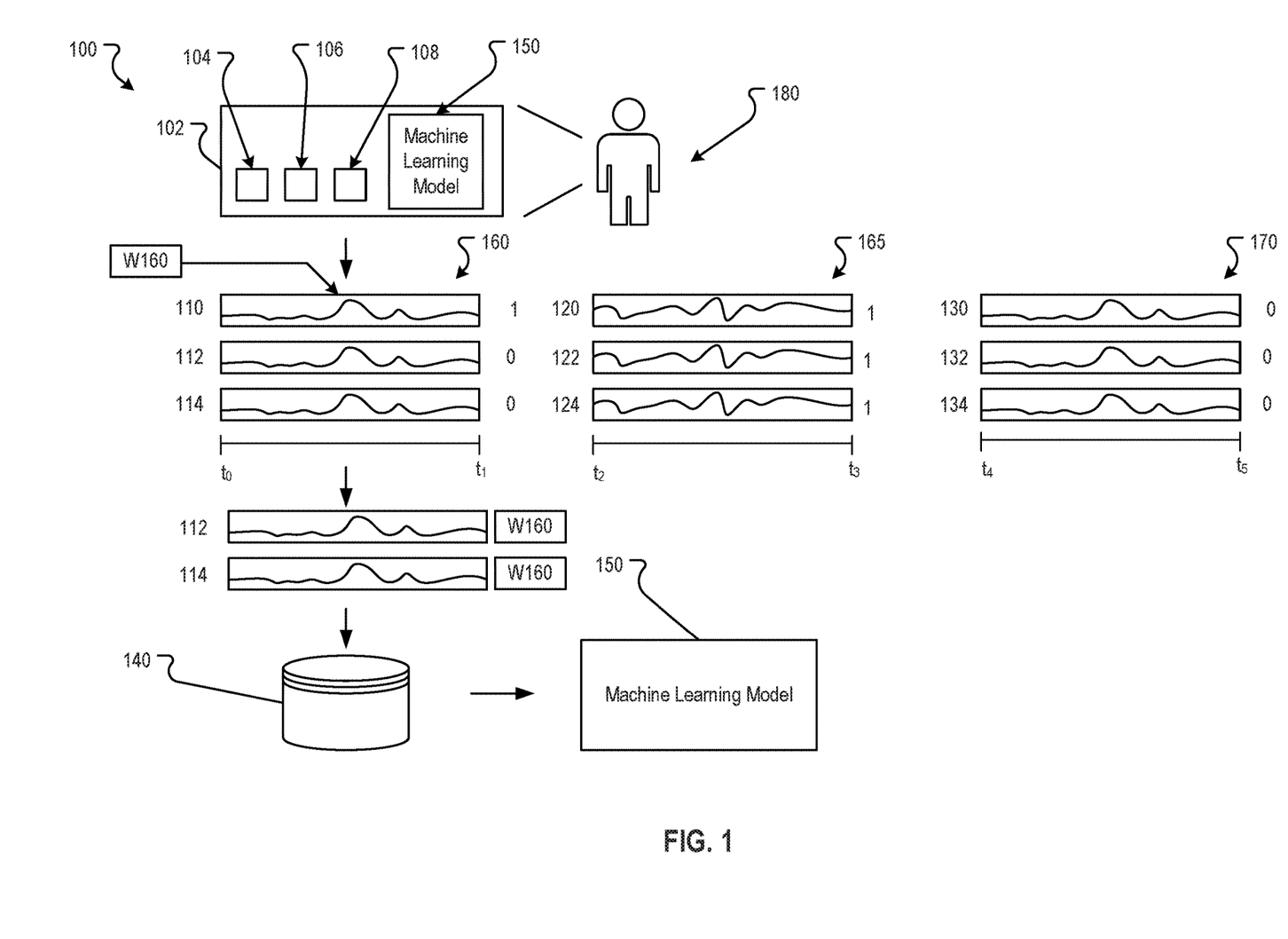
FIG. 1 is a system flow diagram of an audio data collection process and model training.

FIG. 1 is a system flow diagram 100 of an audio data collection process and model training. A person 180 uses electronic device 102 and speaks into the device, e.g., to invoke an electronic assistant. The electronic device 102 includes three microphones 104, 106 and 108. The electronic device 102 also includes a machine learning model 150 (or some other audio processing system or process that detects particular audio features, and which may be generally referred to as a "detector").

Audio data generated by the microphones 104, 106 and 108 may be stored temporarily in a data storage medium 140, such as on-device memory. Assume the person 180 has spoken into the device 102 at three different times, resulting in the microphones in the electronic device 102 generating the set of audio recordings 160, 165 and 170 over respective time intervals t0-t1, t2-t3, and t4-t5. Each set of audio recording comprises three audio recordings. The set of audio recordings 160 includes three audio recordings 110, 112 and 114. Similarly, the set of audio recordings 165 and 170 include of recordings 120, 122, 124 and 130, 132, 134, respectively.

As will be described, only one of the sets of audio recordings is used to generate a labeled training example. In particular, the machine learning model 150 (or other detection process) determines the presence of an audio feature, e.g., a particular hot word or phrase, in the audio recording 110 of the set 160, but does not detect the audio feature in the recordings 112 and 114. The positive detection is indicated by the value of 1 next to the recording 110, and the lack of detection is indicated by the value of 0 next to the recordings 112 and 114. Here the audio feature is the detection of a particular hot word, indicated by the reference W160.

The other audio recordings 112 and 114 in the set of audio recordings 160 are stored as training examples because the word W160 was not detected in these recordings. In particular, the recordings 112 and 114 are labeled with the word W160 detected by the model 140. The training examples 112 and 114 along with the corresponding labels W160 are then stored on the storage medium 140. Upon storing the training examples, the training examples can be used to further train the machine learning model 150, or, alternatively, provided to a system external to the user device 102 for use in training a model. The model may then be trained using this data and other audio data.

The other sets of audio data—sets 165 and 170—are not used to create labeled training examples. Each is not used, however, for different reasons. With reference to set 165, the audio feature is detected in each audio recording 120, 122 and 124. Detection across all audio recordings is typically indicative of a clearly spoken word with little noise relative to the signal, and thus has less utility for training a machine leaned process than audio in which the feature is more susceptible to noise or other detection challenges. Accordingly, the audio is not used to generate labeled training examples.

With reference to set 170, the audio feature is not detected in any audio recording 130, 132 and 134. No detections across all audio is indicates audio that cannot be used for training a detection model. Accordingly, the audio is not used to generate labeled training examples.

Figure 2A:
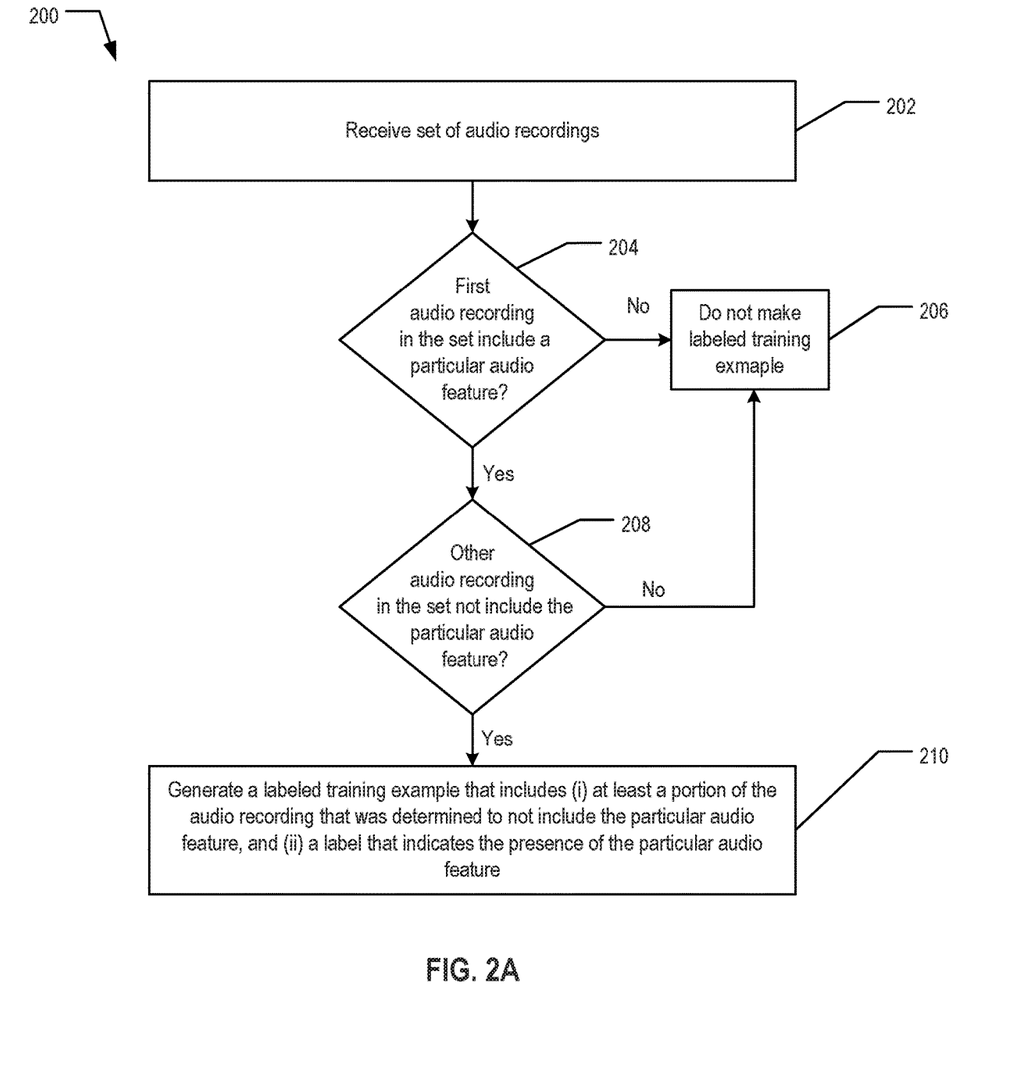
FIG. 2A is a flow diagram of an example process for generating a labeled training example.
Figure 2B:
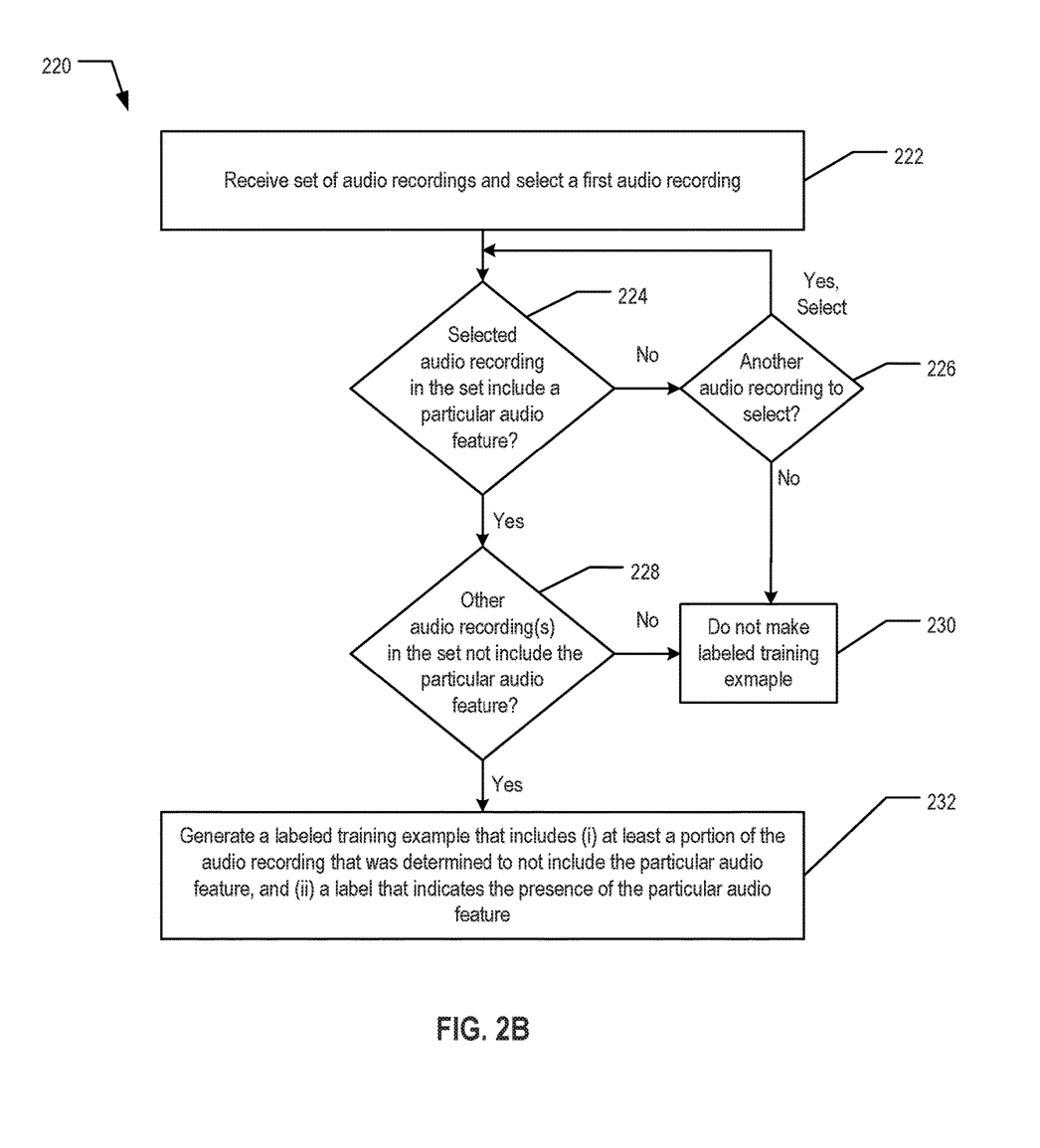
FIG. 2B is a flow diagram of another example process for generating a labelled training example.

FIGS. 2A and 2B are two example system flow diagrams of example processes 200 and 220 for generating a labeled training example. The process of 200 of FIG. 2A is a process that only generates a labeled training example when the audio feature is detected in a first recording (e.g., a recording from a primary or predetermined microphone) and is not detected in one or more recordings from other microphones. The process 200 is used when power conservation is desired, or when a higher confidence can be determined because the predetermined microphone typically generates a higher quality audio signal relative to the other microphone.

The process of 220 of FIG. 2B is a process that generates a labeled training example when the audio feature is detected in any of the audio recordings in a set, and is not detected in at least one other audio recording in the set. The process 220 is used when a more aggressive approach is desired to generate labeled training examples.

Each process can be performed on the user device 102, or, alternatively, in a cloud based system that receives the set of audio recordings from the user device.

With reference to FIG. 2A, the process 200 receives a set of audio recordings (202). For example, any one of the sets 160, 165 or 170 of FIG. 1 may be received.

Upon receiving the set of audio recordings, a first audio recording in the set is analyzed by a detector to detect the particular audio feature (204). The detector may be a machine learned model, or some other process, software or device that is capable of detecting a particular audio feature. If the first audio recording in the set is determined to not include the first audio feature, then the process 200 does not make a labeled training example (206).

If, however, the first audio recording in the set is determined to include the first audio feature, then the process 200 determines whether other audio recordings in the set of audio recordings do not include the particular audio feature (208).

If the process 200 fails to detect the audio feature in one or more of the other audio recordings in the set, the one or more audio recordings are labelled with the audio feature and used as training example. In particular, the process 200 generates a labeled training example that includes (i) at least a portion of the audio recording that was determined to not include the particular audio feature, and (ii) a label that indicates the presence of the particular audio feature (210).

Conversely, if the process 200 detects the audio feature in each of other audio recordings in the set, then the process 200 does not make a labeled training example (206).

With reference to FIG. 2B, the process 220 receives a set of audio recordings (222). For example, any one of the sets 160, 165 or 170 of FIG. 1 may be received.

The process 200 then selects an audio recording in the set, and determines whether the audio recording in the set includes the particular audio feature (224). If the audio recording does not include the audio feature, then the process determines whether there is another audio recording that has not been processed to select (226). If so, the recording is selected and the process 200 returns to 224. If not, then none of the audio recordings includes the audio feature, and thus the process 200 does not make a labeled training example (230).

If, however, the selected audio recording does include the audio feature, then the process 200 determines whether other audio recordings in the set of audio recordings do not include the particular audio feature (228).

If the process 220 fails to detect the audio feature in one or more of the other audio recordings in the set, the one or more audio recordings are labelled with the audio feature and used as training example. In particular, the process 220 generate a labeled training example that includes (i) at least a portion of the audio recording that was determined to not include the particular audio feature, and (ii) a label that indicates the presence of the particular audio feature (232).

Conversely, if the process 220 detects the audio feature in each of other audio recordings in the set, then the process 220 does not make a labeled training example (226).

Figure 3:
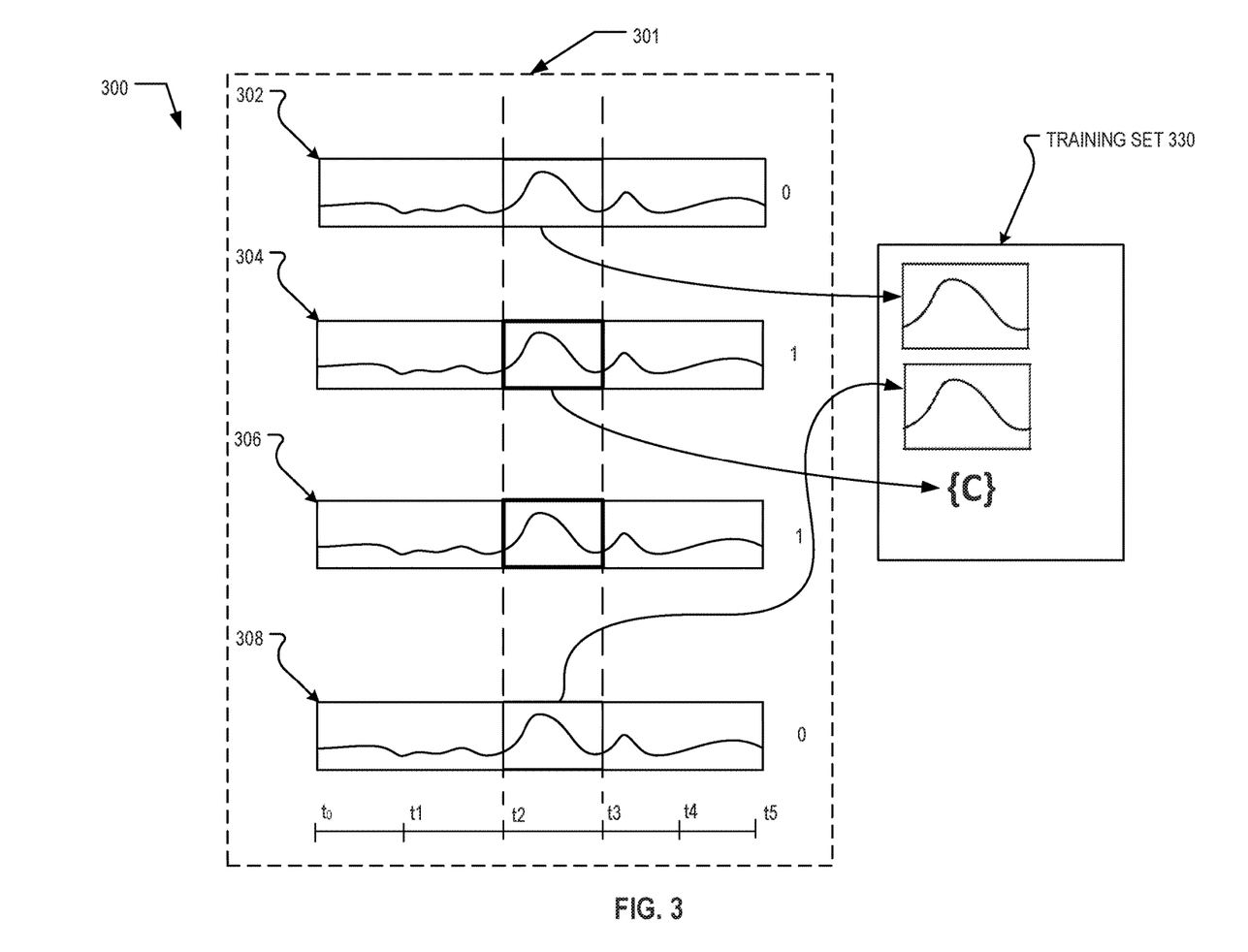
FIG. 3 illustrates an example of generating a labelled training example from a set of audio recording data.

In some implementations, the entire segment or each audio recording is stored as the labeled training example. In other implementations, only the portions of the audio recordings in which the audio feature is detected are stored as the labeled training example. This latter implementation is illustrated in FIG. 3, which is an illustration of generating a labelled training example from a set of audio recording data.

The set of audio recordings 301 include four audio recordings 302, 304, 306 and 308, recorded during the time period from t0-t5. The detection process detects the presence of an audio feature of interest, indicated by the bracketed {C}, in the audio between the time period of t2-t3 in audio recordings 304 and 306, as indicated by the bounded boxes of the time period of t2-t3 in these audio recordings. In the recordings 302 and 308, however, the audio feature is not detected.

The system (e.g., the user device executing a program to generate the labeled audio data, or a cloud-based system executing a program to generate the labeled audio data), selects, from the portion of the audio recordings that were determined to not include the particular audio feature, a sub-portion of the audio recordings that is coincident in time with the sub-portion of the audio recording(s) that was determined to include the particular audio feature. For example, the sub-portions of the audio recordings for the time period between t2 and t3 are selected. The selected sub-portions of the audio recordings 302 and 308 are then used as the portion of the audio recordings to generate the labeled training 330 data labeled with the descriptor {C}. The descriptor {C} indicates the presence of the audio feature. The sub-portions from the recordings 304 and 306 may also be used in the labeled training data.

Once a labelled dataset comprising labelled training examples has been generated, it may be used to train a machine learned model for recognizing audio features in audio. The machine learned model may comprise, for example, a neural network model, such as a convolutional neural network, recurrent neural network and/or long-short-term memory network. The machine learning model may be trained from scratch, for example using randomly initialized model parameters. Alternatively, a pre-trained neural network may be refined using the generated labelled dataset.

During training, audio data from a labelled example in the labelled dataset is processed by the machine learning model to generate a candidate classification/descriptor for the audio data. The candidate classification/descriptor may indicate the potential presence of an audio feature in the audio data. In some embodiments, only audio data from a particular device is used during the training in order to tailor the model to the properties of that particular device.

The candidate classification/descriptor is compared to the known label for the audio data. The comparison may be performed using a classification loss function. An example of such a loss function is the cross entropy loss function.

Parameters of the machine learned model are updated based on the comparison of the candidate classification/descriptor to the known label for the audio data. Such parameters may, for example, include the weights and biases of neural network nodes. An optimization procedure, such as gradient descent, may be used to determine the parameter updates from the loss function.

The training may be iterated until a threshold condition is satisfied. The threshold condition may be a threshold number of iterations and/or a threshold classification accuracy on a verification dataset being achieved. At each iteration, different audio data from a labelled example in the labelled dataset may be used.

Once trained, the machine learning model can be used by a device to perform audio recognition/classification tasks.

In some implementations, it may be desirable to set an audio feature detection threshold of the labelling model to a high value to boost the precision of detected audio features, even if this comes at the cost of collecting less data. This is because the detection threshold affects the balance between the "quality" and the "amount" of collected audio examples. The optimal choice may be use-case-specific, but in general high thresholds maximizing precision are more likely to work well in this context, since confidence in the correctness of the inferred labels to be able to use them to train high-quality models. The situation, where the correctness of the inferred labels is less important arises if the collected data could be verified by human raters. While this doesn't have all the advantages of eliminating human raters completely, it might still be advantageous because if reduces the amount of data that need to be handed to the raters, and their rating could be simplified to accepting or rejecting the machine inferred labels.

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method, comprising:
receiving sets of audio recordings by a user device that includes a plurality of microphones, wherein, for each set of audio recordings, each audio recording in the set is recorded over a respective separate microphone in the plurality of microphones in the user device during a particular time interval, and each particular time interval is different for each set of audio recordings;
for each set of audio recordings, determining, by a detector, whether an audio recording in the set of audio recordings includes a particular audio feature, and whether another one of the audio recordings does not include the particular audio feature;

for each set of audio recordings determined to include an audio recording that includes the particular audio feature and to include another audio recording that does not include the particular audio feature, generating a labeled training example that includes (i) at least a portion of the audio recording that was determined to not include the particular audio feature, and (ii) a label that indicates the presence of the particular audio feature.

2. The computer-implemented method of claim 1, further comprising:
training a machine learned model using the generated labeled training examples.

3. The computer-implemented method of claim 1, detector is a machine learned model is executing on the user device.

4. The computer-implemented method of claim 1, wherein generating the labeled training example that includes (i) at least the portion of the audio recording that was determined to not include the particular audio feature, and (ii) the label that indicates the presence of the particular audio feature comprises:
generating the labeled training example so that it includes (i) a portion of each audio recording that was determined to not include the particular audio feature, and (ii) the label that indicates the presence of the particular audio feature.

5. The computer-implemented method of claim 1, wherein generating the labeled training example that includes (i) at least the portion of the audio recording that was determined to not include the particular feature, and (ii) the label that indicates the presence of the particular feature comprises:
generating the labeled training example so that it includes (i) a portion of all audio recordings in the set of audio recordings, and (ii) the label that indicates the presence of the particular audio feature.

6. The computer-implemented method of claim 1, wherein generating the labeled training example that includes (i) at least the portion of the audio recording that was determined to not include the particular audio feature, and (ii) the label that indicates the presence of the particular audio feature comprises:
selecting, from the portion of the audio recording that was determined to not include the particular audio feature, a sub-portion of the audio recording that is coincident in time with a sub-portion of the audio recording that was determined to include the particular audio feature and from which the particular audio feature was determined to be present in the audio recording; and
using the selected sub-portion as the portion of the audio recording.

7. The computer implemented method of claim 1, wherein determining, by the detector, whether an audio recording in the set of audio recordings includes a particular audio feature, and whether another one of the audio recordings does not include the particular audio feature comprises:
determining whether an audio recording from a first microphone includes the particular audio feature;
when the audio recording from the first microphone is determine to include the particular audio feature, determining whether audio recordings from one or more of the other microphones include the particular audio feature; and when the audio recording from the first microphone is determine to not include the particular audio feature, not determining whether audio recordings from one or more of the other microphones include the particular audio feature.

8. The computer implemented method of claim 1, wherein determining, by the detector, whether an audio recording in the set of audio recordings includes a particular audio feature, and whether another one of the audio recordings does not include the particular audio feature comprises:
determining whether an audio recording from a first microphone includes the particular audio feature; and
when the audio recording from the first microphone is determined not to include the particular audio feature, determining whether an audio recording from at least one of the other microphones includes the particular audio feature.

9. The computer-implemented method of claim 1, wherein the detector is a keyword spotter, and the particular audio feature is a detection of an utterance of a keyword in an audio recording.

10. A system, comprising:
a data processing apparatus; and
a non-transitory computer readable medium storing instructions executable by the data processing apparatus and that upon such execution cause the data processing apparatus to perform operations comprising:
receiving sets of audio recordings by a user device that includes a plurality of microphones, wherein, for each set of audio recordings, each audio recording in the set is recorded over a respective separate microphone in the plurality of microphones in the user device during a particular time interval, and each particular time interval is different for each set of audio recordings;
for each set of audio recordings, determining, by a detector, whether an audio recording in the set of audio recordings includes a particular audio feature, and whether another one of the audio recordings does not include the particular audio feature;
for each set of audio recordings determined to include an audio recording that includes the particular audio feature and to include another audio recording that does not include the particular audio feature, generating a labeled training example that includes (i) at least a portion of the audio recording that was determined to not include the particular audio feature, and (ii) a label that indicates the presence of the particular audio feature.

11. The system of claim 10, the operations further comprising:
training a machine learned model using the generated labeled training examples.

12. The system of claim 10, wherein the detector is a machine learned model is executing on the user device.

13. The system of claim 10, wherein generating the labeled training example that includes (i) at least the portion of the audio recording that was determined to not include the particular audio feature, and (ii) the label that indicates the presence of the particular audio feature comprises:
generating the labeled training example so that it includes (i) a portion of each audio recording that was determined to not include the particular audio feature, and (ii) the label that indicates the presence of the particular audio feature.

14. The system of claim 10, wherein generating the labeled training example that includes (i) at least the portion of the audio recording that was determined to not include the particular feature, and (ii) the label that indicates the presence of the particular feature comprises:

generating the labeled training example so that it includes (i) a portion of all audio recordings in the set of audio recordings, and (ii) the label that indicates the presence of the particular audio feature.

15. The system of claim 10, wherein generating the labeled training example that includes (i) at least the portion of the audio recording that was determined to not include the particular audio feature, and (ii) the label that indicates the presence of the particular audio feature comprises:

selecting, from the portion of the audio recording that was determined to not include the particular audio feature, a sub-portion of the audio recording that is coincident in time with a sub-portion of the audio recording that was determined to include the particular audio feature and from which the particular audio feature was determined to be present in the audio recording; and  using the selected sub-portion as the portion of the audio recording.

16. The system of claim 10, wherein determining, by the detector, whether an audio recording in the set of audio recordings includes a particular audio feature, and whether another one of the audio recordings does not include the particular audio feature comprises:

determining whether an audio recording from a first microphone includes the particular audio feature;

when the audio recording from the first microphone is determine to include the particular audio feature, determining whether audio recordings from one or more of the other microphones include the particular audio feature; and  when the audio recording from the first microphone is determine to not include the particular audio feature, not determining whether audio recordings from one or more of the other microphones include the particular audio feature.

17. The computer implemented method of claim 1, wherein determining, by the detector, whether an audio recording in the set of audio recordings includes a particular audio feature, and whether another one of the audio recordings does not include the particular audio feature comprises:

determining whether an audio recording from a first microphone includes the particular audio feature; and  when the audio recording from the first microphone is determined not to include the particular audio feature, determining whether an audio recording from at least one of the other microphones includes the particular audio feature.

18. The computer-implemented method of claim 1, wherein the detector is a keyword spotter, and the particular audio feature is a detection of an utterance of a keyword in an audio recording.

19. A non-transitory computer readable medium storing instructions executable by a data processing apparatus and that upon such execution cause the data processing apparatus to perform operations comprising:

receiving sets of audio recordings by a user device that includes a plurality of microphones, wherein, for each set of audio recordings, each audio recording in the set is recorded over a respective separate microphone in the plurality of microphones in the user device during a particular time interval, and each particular time interval is different for each set of audio recordings;

for each set of audio recordings, determining, by a detector, whether an audio recording in the set of audio recordings includes a particular audio feature, and whether another one of the audio recordings does not include the particular audio feature;

for each set of audio recordings determined to include an audio recording that includes the particular audio feature and to include another audio recording that does not include the particular audio feature, generating a labeled training example that includes (i) at least a portion of the audio recording that was determined to not include the particular audio feature, and (ii) a label that indicates the presence of the particular audio feature.

\* \* \* \* \*